US012731493B2

(12) United States Patent
Nordbruch et al.

(10) Patent No.: US 12,731,493 B2
(45) Date of Patent: Sep. 8, 2026

(54) CONCEPT FOR ASSISTING A MOTOR VEHICLE

(71) Applicant: Robert Bosch GmbH, Stuttgart (DE)

(72) Inventors: Stefan Nordbruch, Leonberg (DE); Anna Gaszczak, Fellbach (DE); Rolf Nicodemus, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 219 days.

(21) Appl. No.: 18/056,113

(22) Filed: Nov. 16, 2022

(65) Prior Publication Data

US 2023/0186773 A1 Jun. 15, 2023

(30) Foreign Application Priority Data

Dec. 9, 2021 (DE) ..................... 10 2021 214 057.2

(51) Int. Cl.

| | |
|---|---|
| ***G08G 1/16*** | (2006.01) |
| ***B60W 30/06*** | (2006.01) |
| ***H04W 4/38*** | (2018.01) |
| ***H04W 4/44*** | (2018.01) |

(52) U.S. Cl.

CPC ............. *G08G 1/168* (2013.01); *B60W 30/06* (2013.01); *H04W 4/38* (2018.02); *H04W 4/44* (2018.02); *B60W 2556/45* (2020.02)

(58) Field of Classification Search

CPC ........ G08G 1/168; G08G 1/0116; G08G 1/04; G08G 1/143; G08G 1/146; B60W 30/06; B60W 2556/45; H04W 4/38; H04W 4/44; H04L 67/12; H04L 67/52

See application file for complete search history.

(56) References Cited

U.S. PATENT DOCUMENTS

2017/0351267 A1* 12/2017 Mielenz ............... G05D 1/0212
2019/0132709 A1* 5/2019 Graefe .................... H04W 4/46

FOREIGN PATENT DOCUMENTS

| | | | | |
|---|---|---|---|---|
| DE | 102016223830 A1 | 5/2018 | | |
| DE | 102018212998 A1 | 2/2020 | | |
| WO | WO-2008061540 A1 * | 5/2008 | ............. | G08G 1/148 |
| WO | 2018029101 A1 | 2/2018 | | |

* cited by examiner

*Primary Examiner* — Jason Holloway
*Assistant Examiner* — Elizabeth Rose Neleski
(74) *Attorney, Agent, or Firm* — Norton Rose Fulbright US LLP

(57) ABSTRACT

A system for the infrastructure-based assistance of a motor vehicle driven in an at least semi-automated manner within a parking facility. The system includes: a parking facility management system configured to operate the parking facility including planning of a drive of the motor vehicle drive in an at least semi-automated manner within the parking facility, a first base unit situated within the parking facility, communicatively linked to the parking facility management system, and connected to at least one surroundings sensor situated within the parking facility in the surroundings of the first base unit, the first base unit being configured to ascertain first infrastructure assistance data for the infrastructure-based assistance of the motor vehicle driven in an at least semi-automated manner within the parking facility, and a wireless communication interface configured to transmit the ascertained first infrastructure assistance data to the motor vehicle.

7 Claims, 4 Drawing Sheets

201
203
107
113
115
117
105
118
122
125
123
127
111
109
108
121
119
209
213
211
207
217
205
215
parking facility management system
129

303
operate parking facility using parking facility management system
plan drive
301
ascertain first infra-structure assistance data
305
transmit ascertained first infrastructure assistance data
307

CONCEPT FOR ASSISTING A MOTOR VEHICLE

CROSS REFERENCE

The present application claims the benefit under 35 U.S.C. § 119 of German Patent Application No. DE 10 2021 214 057.2 filed on Dec. 9, 2021, which is expressly incorporated herein by reference in its entirety.

FIELD

The present invention relates to a system for the infrastructure-based assistance of a motor vehicle driven in an at least semi-automated manner within a parking facility, to a method for the infrastructure-based assistance of a motor vehicle driven in an at least semi-automated manner within a parking facility, to a computer program and to a machine-readable memory medium.

BACKGROUND INFORMATION

AVP stands for "Automated Valet Parking" and may be translated into German as "Automatischer Parkservice."

Parking facilities that are able to provide an AVP functionality for a motor vehicle include multiple surroundings sensors, each of which detects an area of the parking facility. The surroundings sensor data corresponding to the detection are transmitted from the surroundings sensors to a central server, which evaluates the surroundings sensor data and, based on the evaluation, ascertains infrastructure assistance data, on the basis of which the motor vehicle is able to be driven in an at least semi-automated manner within the parking facility. The infrastructure assistance data are transmitted wirelessly, for example, via WLAN, to the motor vehicle.

German Patent Application No. DE 10 2016 223 830 A1 describes a method for operating an automated vehicle.

German Patent Application No. WO 2018/029101 A1 describes a control of an autonomous vehicle.

U.S. Patent Application Publication No. US 2019/0132709 A1 describes a sensor network.

SUMMARY

An object underlying the present invention is seen as providing a concept for the efficient infrastructure-based assistance of a motor vehicle driven in an at least semi-automated manner within a parking facility.

This object may be achieved with the aid of features of the present invention. Advantageous embodiments of the present invention are disclosed herein.

According to one first aspect of the present invention, a system is provided for the infrastructure-based assistance of a motor vehicle driven in an at least semi-automated manner within a parking facility. According to an example embodiment of the present invention, the system includes:

- a parking facility management system, which is configured to operate the parking facility, the operation including a planning of a drive of the motor vehicle driven in an at least semi-automated manner within the parking facility in order to ascertain planning data corresponding to the planning,
- a first base unit, which is situated within the parking facility and is communicatively linked to the parking facility management system, the first base unit being connected to at least one surroundings sensor situated within the parking facility in the surroundings of the first base unit detecting a first area of the parking facility,
- the first base unit being configured to ascertain first infrastructure assistance data for the infrastructure-based assistance of the motor vehicle driven in an at least semi-automated manner within the parking facility based on surroundings sensor data of the at least one surroundings sensor representing the detected first area and based on the planning data, and
- at least one wireless communication interface, which is configured to transmit the ascertained first infrastructure assistance data to the motor vehicle.

According to one second aspect of the present invention, a method is provided for the infrastructure-based assistance of a motor vehicle driven in an at least semi-automated manner within a parking facility using the system according to the first aspect. According to an example embodiment of the present invention, the method includes the following steps:

- operating the parking facility with the aid of the parking facility management system, the operation including a planning of a drive of the motor vehicle driven in an at least semi-automated manner within the parking facility in order to ascertain planning data corresponding to the planning,
- ascertaining with the aid of the first base unit first infrastructure assistance data for the infrastructure-based assistance of the motor vehicle driven in an at least semi-automated manner within the parking facility based on the surroundings sensor data and the planning data,
- transmitting the ascertained first infrastructure assistance data to the motor vehicle with the aid of the at least one wireless communication interface.

According to one third aspect of the present invention, a computer program is provided, which includes commands which, when the computer program is executed by a computer, for example, by the system according to the first aspect, prompt the computer to carry out a method according to the second aspect.

According to one fourth aspect of the present invention, a machine-readable memory medium is provided, on which the computer program according to the first aspect is stored.

The present invention is based on and includes the finding that the above object may be achieved in that the system functionalities which are required for an AVP process (AVP stands for "Automated Valet Parking" and may be translated into German as "Automatischer Parkservice") are divided into two subsystems:

A first subsystem, which may also be referred to as the main system, is the parking facility management system which, as a functionality, operates the parking facility. The operation includes a planning of a drive of a motor vehicle, in particular, of multiple motor vehicles, driven in an at least semi-automated manner within the parking facility, in particular, an AVP drive of the motor vehicle, and a second subsystem which, as a functionality, includes the ascertainment of infrastructure assistance data, the second subsystem including one or multiple base units.

The ascertainment of infrastructure assistance data based on surroundings sensor data is not carried out with the aid of the parking facility management system, rather the base units self-sufficiently ascertain the infrastructure assistance data and thus self-sufficiently aid the motor vehicle during the drive driven in an at least semi-automated manner, in particular, during an AVP drive.

The second subsystem is implemented as an edge computing architecture. Edge computing, in contrast to cloud computing, refers to the decentralized data processing at the edge of a network, the so-called edge. This means that according to the concept described here, it is provided that the ascertainment of the infrastructure assistance data is no longer entrusted to a central server, in the present case, to a parking facility management system, but is carried out by one or multiple base units, which are situated within the parking facility. This advantageously shortens a transfer distance between the surroundings sensor and the entity that ascertains the infrastructure assistance data based on the surroundings sensor data, in the present case, the base unit, as compared to the central server, which is generally situated, for example, in a server room, which is for example, located outside the parking facility.

According to the present invention disclosed herein, it is further provided that the base unit does not use the surroundings sensor data of all surroundings sensors that are situated within the parking facility in order to ascertain the infrastructure assistance data, but only a lesser number, for example, 4 to 16, of surroundings sensors. Thus, the base unit or base units is/are connected only to surroundings sensors that are located in the respective surroundings of the base units. In this way, a transfer distance may also be advantageously efficiently reduced as compared to the approach using the central server, which receives the corresponding sensor data from all surroundings sensors of the parking facility.

This may further yield a technical advantage that an effort in laying data cables for the purpose of transferring surroundings sensor data may be efficiently reduced.

This may further yield a technical advantage that a required minimal bandwidth for the data transfer of the surroundings sensor data may be efficiently reduced, since fewer surroundings sensor data are required to be transmitted to an individual base unit as compared to the approach using the central server.

This may further yield a technical advantage that the base units may be more weakly equipped in terms of hardware as compared to a central server, since they are not required to process the same amount of surroundings sensor data compared to the central server, i.e., to the parking facility management system.

In summary, the present invention provides for the efficient infrastructure-based assistance of a motor vehicle driven in an at least semi-automated manner within a parking facility.

An infrastructure-based assistance of the motor vehicle means, in particular, that the motor vehicle is provided infrastructure assistance data. The motor vehicle may, for example, derive handling instructions based on the infrastructure assistance data. The motor vehicle may, for example, decide itself what to do based on the infrastructure assistance data.

Infrastructure assistance data include, for example, one or multiple of the following elements of data: control command for the at least semi-automated controlling of a transverse guidance and/or longitudinal guidance of the motor vehicle, remote control command for the at least semi-automated remote controlling of a transverse guidance and/or longitudinal guidance of the motor vehicle, enabling command for enabling an at least semi-automated, in particular fully-automated, drive of the motor vehicle for a particular period of time in a particular area of the parking facility, a setpoint trajectory for the motor vehicle, a target position within the parking facility, surroundings data, which represent surroundings of the motor vehicle, a preset for what the motor vehicle is to do. The preset specifies, for example, whether the motor vehicle may drive, for example, or must stop, for example.

The wording "in one specific embodiment of the system" used in this description includes the wording "in a specific embodiment of the system, the specific embodiment including, for example, the respective features of at least one of the specific embodiments described in the description." This means, therefore, that the respective features of the specific embodiments described in the description may, for example, be arbitrarily combined.

When "base unit" is in the singular, the plural is always to be implied and vice versa. Statements made in connection with a base unit apply analogously to multiple base units and vice versa.

In one specific embodiment of the system, the system includes a second base unit, which is situated within the parking facility spaced apart from the first base unit, is connected in series to the first base unit, and is communicatively linked to the parking facility management system, the second base unit being connected to at least one further surroundings sensor situated within the parking facility in the surroundings of the second base unit and detecting a second area of the parking facility, the second base unit being configured to ascertain second infrastructure assistance data for the infrastructure-based assistance of the motor vehicle driven in an at least semi-automated manner within the parking facility based on further surroundings data of the at least one further surroundings sensor representing the detected second area, the at least one wireless communication interface being configured to transmit the ascertained second infrastructure assistance data to the motor vehicle.

This yields, for example, the technical advantage that the system may be efficiently expanded. Thus, for example, initially only a section of the parking facility may be equipped in such a way that motor vehicles are able to be driven in this section in an at least semi-automated manner aided by the infrastructure. Thus, for example, AVP motor vehicles may be driven only within this one section. Non-AVP motor vehicles then drive, for example, outside and not within the one section, so that problems that may occur in mixed traffic made up of AVP motor vehicles and non-AVP motor vehicles may be efficiently avoided. The equipping includes an installation of a first base unit as well as of surroundings sensors in the first section.

If it is established over time that the one section has become too small for AVP drives, it is possible in further sections of the parking facility, which directly adjoin the one section, to install further base units and further surroundings sensors, so that more and more sections of the parking facility up to and including the entire parking facility may be equipped in such a way that in these sections or areas motor vehicles may be driven in an at least semi-automated manner while being assisted by infrastructure assistance data.

The base units are therefore in charge of individual areas and may be installed according to demand and/or on a needs-oriented basis, in particular, temporally offset. Instead of the entire parking garage, for example, initially only a first number of parking levels of a parking garage are provided with base units and surroundings sensors.

In this way, the system may be advantageously expanded in each case by adding a new base unit and new surroundings sensors according to demand and/or on a needs-oriented basis.

Thus, the base units take over, in particular, the calculations and/or the control and/or the steering of AVP motor vehicles in their area.

In one specific embodiment of the system, it is provided that immediately adjacent base units are connected to one another. In English, the term “daisy chain” is used for such a topology, “Ganseblümchenkette” in German. This means, therefore, that the base units are connected in a series. That yields, in particular, the technical advantage that the base units are able to receive in each case from immediately adjacent base units the surroundings sensor data of the at least one surroundings sensor, which is connected to the other base units. This is as seen in contrast to a tree topology, which is normally used in the approach including the central server. Compared to a tree topology, an effort for a laying of data cables for the purpose of transferring the surroundings data is reduced in the case of a daisy chain.

In one specific embodiment of the system, it is provided that the first and the second base unit are each configured to ascertain the corresponding infrastructure assistance data based on the corresponding surroundings sensor data of the at least one surroundings sensor of the respective other base unit.

This yields, for example, the technical advantage that the infrastructure data are able to be efficiently ascertained. The surroundings sensor data of the at least one surroundings sensor of the respective other base unit are requested, for example, with the aid of the first or of the second base unit of the respectively other base unit.

In one specific embodiment of the system, it is provided that the operation includes one or multiple of the following steps: updating the base unit(s), updating the surroundings sensor or surroundings sensors, monitoring the base unit(s), monitoring the surroundings sensor or surroundings sensors, verifying the base unit(s), verifying the surroundings sensor or surroundings sensors, executing an order for the at least semi-automated driving of the motor vehicle within the parking facility.

This yields, for example, the technical advantage that the parking facility is able to be efficiently operated.

An updating includes, in particular, an ascertainment of update data and a transmission of the update data to the surroundings sensor or surroundings sensors and/or to the base unit(s). Update data are included, for example, in an update software.

A processing of an order includes, for example, a processing of a query whether a motor vehicle may be driven in an at least semi-automated manner within the parking facility. A processing includes, for example, checking whether the query may be complied with and if so, reserving, for example, a parking position for the motor vehicle.

A drive of the motor vehicle driven in an at least semi-automated manner is, for example, an AVP drive of the motor vehicle. Within the scope of an AVP drive, the motor vehicle is driven in an at least semi-automated manner, for example, from an initial position to a parking position, is parked at the parking position in an at least semi-automated manner, is unparked in an at least semi-automated manner after a parking time has elapsed or in response to a pick-up request and is driven in an at least semi-automated manner to a second position. At the initial position, for example, a driver of the motor vehicle parks his/her motor vehicle. The AVP process begins there. At the second position, for example, the driver retrieves his/her motor vehicle. The AVP process ends there. The first and the second position may be different or may be identical.

A drive of the motor vehicle driven in an at least semi-automated manner within the parking facility is an infrastructure-based drive of the motor vehicle, is thus a drive driven in an at least semi-automated manner, in which the motor vehicle receives aid or assistance via the infrastructure assistance data, which are ascertained with the aid of the base unit(s).

In one specific embodiment of the system, it is provided that the parking facility management system is implemented in a cloud infrastructure and/or locally within the parking facility.

This yields, for example, the technical advantage that the parking facility management system is able to be efficiently implemented.

In one specific embodiment, it is provided that the first and the second base unit each include a first communication means, in particular, a network switch and a second communication device, in particular, a second network switch, the connection between the first and the second base unit being formed using the two first communication devices, and the respective connection between the at least one surroundings sensor and the corresponding base unit being formed using the corresponding second communication device.

This means that the first communication device, for example, is or includes a first network switch. This means that the first communication device, for example, is or includes a second network switch.

In this respect, it may be provided according to one specific embodiment of the system that the first and the second base unit each include a first network switch and a second network switch, the connection between the first and the second base unit being formed using the two first network switches, and the respective connection between the at least one surroundings sensor and the corresponding base unit being formed using the corresponding second network switch.

This yields, for example, the technical advantage that the first and the second base unit and/or the respective at least one surroundings sensor and the corresponding base unit are able to be efficiently connected to one another.

In one specific embodiment of the system, it is provided that the first and the second base unit, in particular, all base units, are situated along a driving path of the parking facility.

This yields, for example, the technical advantages that a communication distance between the base units and the motor vehicle to be assisted is able to be kept as short as possible.

A surroundings sensor within the context of the description is, for example, one of the following surroundings sensors: radar sensor, LIDAR sensor, ultrasonic sensor, video sensor/camera (both mono camera and stereo camera), magnetic field sensor and infrared sensor.

In one specific embodiment of the method according to the second aspect, it is provided that the method is a computer-implemented method.

Technical functionalities of the method according to the second aspect result from corresponding technical functionalities of the system according to the first aspect and vice versa.

This means, therefore, that method features result from system features and vice versa.

The wording "at least semi-automated driving" includes one or multiple of the following cases: assisted driving, semi-automated driving, highly automated driving, fully automated driving.

Assisted driving means that a driver of the motor vehicle continually carries out either the transverse guidance or the longitudinal guidance of the motor vehicle. The respectively other driving task (i.e., a controlling of the longitudinal guidance or of the transverse guidance of the motor vehicle) is carried out automatically. This means, therefore, that during an assisted driving of the motor vehicle either the transverse guidance or the longitudinal guidance is controlled automatically.

Semi-automated driving means that in a specific situation (for example: driving on an expressway, driving within a parking facility, passing an object, driving within a traffic lane defined by traffic lane markings) and/or for a certain period of time, a longitudinal guidance and a transverse guidance of the motor vehicle are controlled automatically. A driver of the motor vehicle him/herself does not have to manually control the longitudinal guidance and transverse guidance of the motor vehicle. However, the driver must continually monitor the automatic control of the longitudinal guidance and transverse guidance in order to be able to manually intervene if needed. The driver must be prepared to take full driving control of the motor vehicle at any time.

Highly automated driving means that for a certain period of time in a specific situation (for example: driving on an expressway, driving within a parking facility, passing an object, driving within a traffic lane defined by traffic lane markings), a longitudinal guidance and a transverse guidance of the motor vehicle are controlled automatically. A driver of the motor vehicle him/herself does not have to manually control the longitudinal guidance and transverse guidance of the motor vehicle. The driver does not have to continually monitor the automatic control of the longitudinal guidance and transverse guidance in order to be able to manually intervene if needed. If needed, a take-over request is automatically output to the driver for taking control of the longitudinal guidance and transverse guidance, in particular, with a sufficient time reserve. The driver must therefore potentially be able to take control of the longitudinal guidance and the transverse guidance. Limits of the automatic control of the transverse guidance and the longitudinal guidance are automatically recognized. During highly automated driving, it is not possible to automatically bring about a minimal risk state in every initial situation.

Fully automated driving means that in a specific situation (for example: driving on an expressway, driving within a parking facility, passing an object, driving within a traffic lane defined by traffic lane markings), a longitudinal guidance and transverse guidance of the motor vehicle is controlled automatically. A driver of the motor vehicle him/herself does not have to manually control the longitudinal guidance and transverse guidance of the motor vehicle. The driver does not have to monitor the automatic control of the longitudinal guidance and transverse guidance in order to be able to manually intervene if needed. Prior to a termination of the automatic control of the transverse guidance and longitudinal guidance, a request is automatically made to the driver to assume the driving task (control of the transverse guidance and longitudinal guidance of the motor vehicle), in particular, with a sufficient time reserve. If the driver does not assume the driving task, a return to a minimal risk situation takes place automatically. Limits of the automatic control of the transverse guidance and longitudinal guidance are automatically recognized. In all situations, it is possible to return to a minimal risk system state. In the case of AVP, it may be a fully automated driving, the driver no longer even having to be in the motor vehicle. The motor vehicle may actually drive without a driver.

The terms "assist" and "aid" may be used synonymously. "At least one" stands for "one or multiple".

The motor vehicle is configured, for example, to be driven in an at least semi-automated manner. The motor vehicle is, for example, an AVP motor vehicle. Such a motor vehicle is configured, in particular, to carry out an AVP operation. AVP stands for "Automated Valet Parking" and may be translated into German as "Automatischer Parkservice."

In one specific embodiment of the system, it is provided that at least one base unit includes in each case at least one wireless communication interface.

This yields, for example, the technical advantage that the wireless communication interface is able to be efficiently implemented.

At this point, it is noted that not every base unit must include a wireless communication interface. A base unit without a wireless communication interface may communicate, for example, with the aid of the wireless communication interface of the adjacent base unit, i.e., may transmit the infrastructure assistance data to the motor vehicle with the aid of the wireless communication interface of the adjacent base unit.

According to one specific embodiment of the system, it is provided that each base unit includes a dedicated wireless communication interface.

According to one specific embodiment of the system, it is provided that only some of the base units in each case include a dedicated wireless communication interface.

When an exemplary system is described in the description, in which each of the base units in each case includes a dedicated wireless communication interface, then the corresponding statements also apply to a system in which only some of the base units in each case include a dedicated wireless communication interface.

A wireless communication interface within the context of the description is, for example, situated separately from the base units within the parking facility. For example, one or multiple base units each includes/include a dedicated wireless communication interface. For example, one or multiple base units in each case includes/include no dedicated wireless communication interface, i.e., that these base units are free of a dedicated wireless communication interface. For example, one or multiple wireless communication interfaces is/are situated separately from the base units within the parking facility, for example, mounted at a ceiling and/or at a column and/or at a wall. A base unit without a dedicated wireless communication interface may, for example, use such a wireless communication interface in order to communicate with the motor vehicle, i.e., in order to transmit the infrastructure assistance data to the motor vehicle.

A wireless communication interface within the context of the description is situated, for example, within the parking facility.

A base unit includes, for example: a first network switch, which enables the connection to two or more adjacent base units, a second network switch, which makes it possible to connect this switch to all surroundings sensors around the base unit, a computer for executing algorithms, the computer including, for example, a standard x86 CPU, the computer including, for example, one or multiple processors and, for example, a wireless communication interface, which is, for example, a WLAN access point, in order to enable a wireless connection to the (AVP) motor vehicle.

The base unit according to one specific embodiment of the system is connected via the first network switch to two or more adjacent base units. The base unit according to one specific embodiment of the system is connected via the second network switch to the corresponding surroundings sensors.

The first and/or the second network switch according to one specific embodiment of the system may also be used for a communication link between a base unit and the parking facility management system.

The exemplary embodiments and specific embodiments described herein may be arbitrarily combined with one another, even if this is not explicitly described.

BRIEF DESCRIPTION OF THE DRAWINGS

Exemplary embodiments of the present invention are represented in the figures and explained in greater detail in the following description.

DETAILED DESCRIPTION OF EXAMPLE EMBODIMENTS

Figure 1:
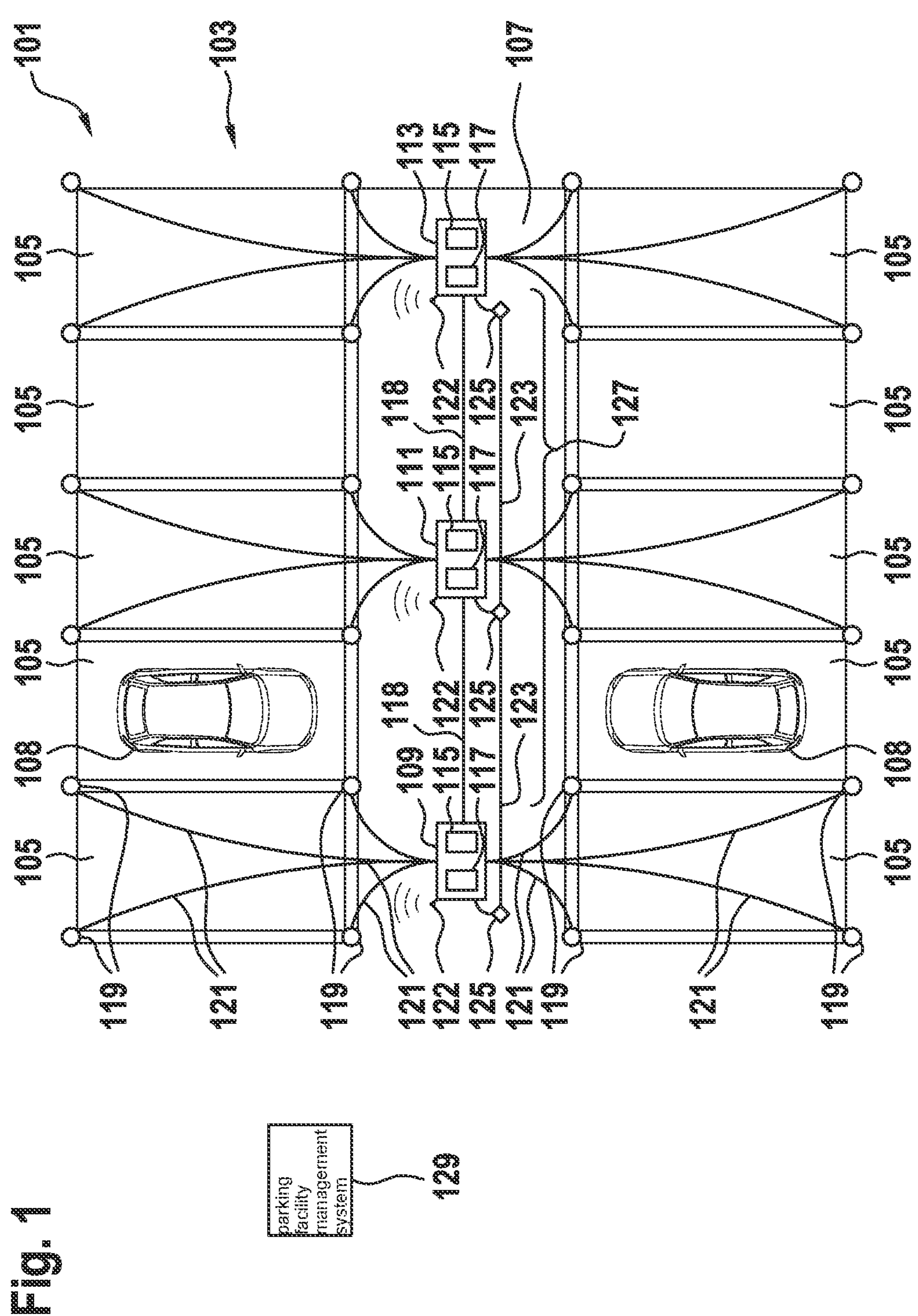
FIG. 1 shows a first system according to the first aspect of the present invention.

In the following, identical reference numerals may be used for identical features.

FIG. 1 shows a first system 101 for the infrastructure-based assistance of a motor vehicle driven in an at least semi-automated manner within a parking facility 103 in a schematic top view. Parking facility 103 includes multiple parking spaces 105 for motor vehicles and a roadway 107 for motor vehicles which defines a driving path for the motor vehicle. Parking spaces 105 are situated transversely to driving path 107: 5 parking spaces 105 above driving path 107 and 5 parking spaces 105 below roadway 107 relative to the paper plane. For example, two motor vehicles 108 are shown, the one motor vehicle 108 being parked on the second, upper parking space 105 from the left and the other motor vehicle 108 being parked on the second, lower parking space 105 from the left.

System 101 includes a first base unit 109, a second base unit 111 and a third base unit 113, which are situated along driving path 107, for example, at a ceiling (not shown) of parking facility 103. The three base units 109, 111, 113 each include a first network switch 115 and a second network switch 117.

Using corresponding first network switches 115, first base unit 109 is connected to second base unit 111 and second base unit 111 is connected to third base unit 113, in each case in series. A respective connection between base units 109, 111, 113 is represented with the aid of a line with reference numeral 118. Respective connection 118 is, for example, an Ethernet connection.

Using corresponding second network switches 117, the three base units 109, 111, 113 are each connected to surroundings sensors 119, which are situated in the respective surroundings of the three base unit 109, 111, 113 within parking facility 103. First system 101 includes surroundings sensors 119. A respective connection between base units 109, 111, 113 and surroundings sensors 119 are marked by lines with reference numeral 121, for the sake of clarity, the corresponding lines with reference numeral 121 being provided only for first base unit 109.

It is provided that individual base units 109, 111, 113 are not connected to all surroundings sensors 119, which are located within the parking facility, but only with those surroundings sensors in their immediate surroundings. Thus, it is provided, for example, that a surroundings sensor 119 is situated at each corner of parking spaces 105. The three base units 109, 111, 113 are each connected to 4 respective surroundings sensors of an upper and of a lower parking space 105, i.e., in the present case, to a total of 8 surroundings sensors 119.

Surroundings sensors 119 detect one area each of parking facility 103 and convey surroundings sensor data corresponding to the detection to corresponding base units 109, 111, 113. Based on the surroundings sensor data, corresponding base units 109, 111, 113 ascertain infrastructure assistance data.

The three base units 109, 111, 113 each include a wireless communication interface 122, with the aid of which they transmit the infrastructure assistance data wirelessly to a motor vehicle.

In one specific embodiment not shown, first system 101 includes one or multiple wireless communication interfaces, which are situated separately from base units 109, 111, 113 within parking facility 103.

The three base units 109, 111, 113 are further supplied with electrical power via an electrical line 123. It is provided that the three base units 109, 111, 113 are each electrically connected to electrical line 123 via an electrical terminal 125. Electrical terminal 125 is, for example, an electric socket or a junction box, from which one electrical cable each leads to the corresponding base unit.

The three base units 109, 111, 113, by being connected in series to one another, form a daisy chain, which is marked symbolically by a curly bracket with reference numeral 127.

First system 101 further includes a parking facility management system 129, which is configured to operate first parking facility 103, the operation including a planning of a drive of a motor vehicle driven in an at least semi-automated manner within parking facility 103 in order to ascertain planning data corresponding to the planning. The three base units 109, 111, 113 are communicatively linked to parking facility management system 129, for example, via an Ethernet line (not shown).

Parking facility management system 129 conveys the planning data to at least one, in particular to all, of the three base units 109, 111, 113. The corresponding base unit(s) ascertains/ascertain the corresponding infrastructure assistance data in addition to the corresponding surroundings sensor data based on the planning data.

Planning data include, for example, a parking position for a motor vehicle so that that base unit of the three base units 109, 111, 113, in whose area the parking position is located, ascertains infrastructure assistance data for the motor vehicle for parking in the parking position. Planning data include, for example, an end time, when upon reaching it, a parked motor vehicle is to be unparked, so that that base unit of the three base units, in whose area the parked motor vehicle is located, ascertains infrastructure assistance data for the motor vehicle for unparking.

Figure 2:
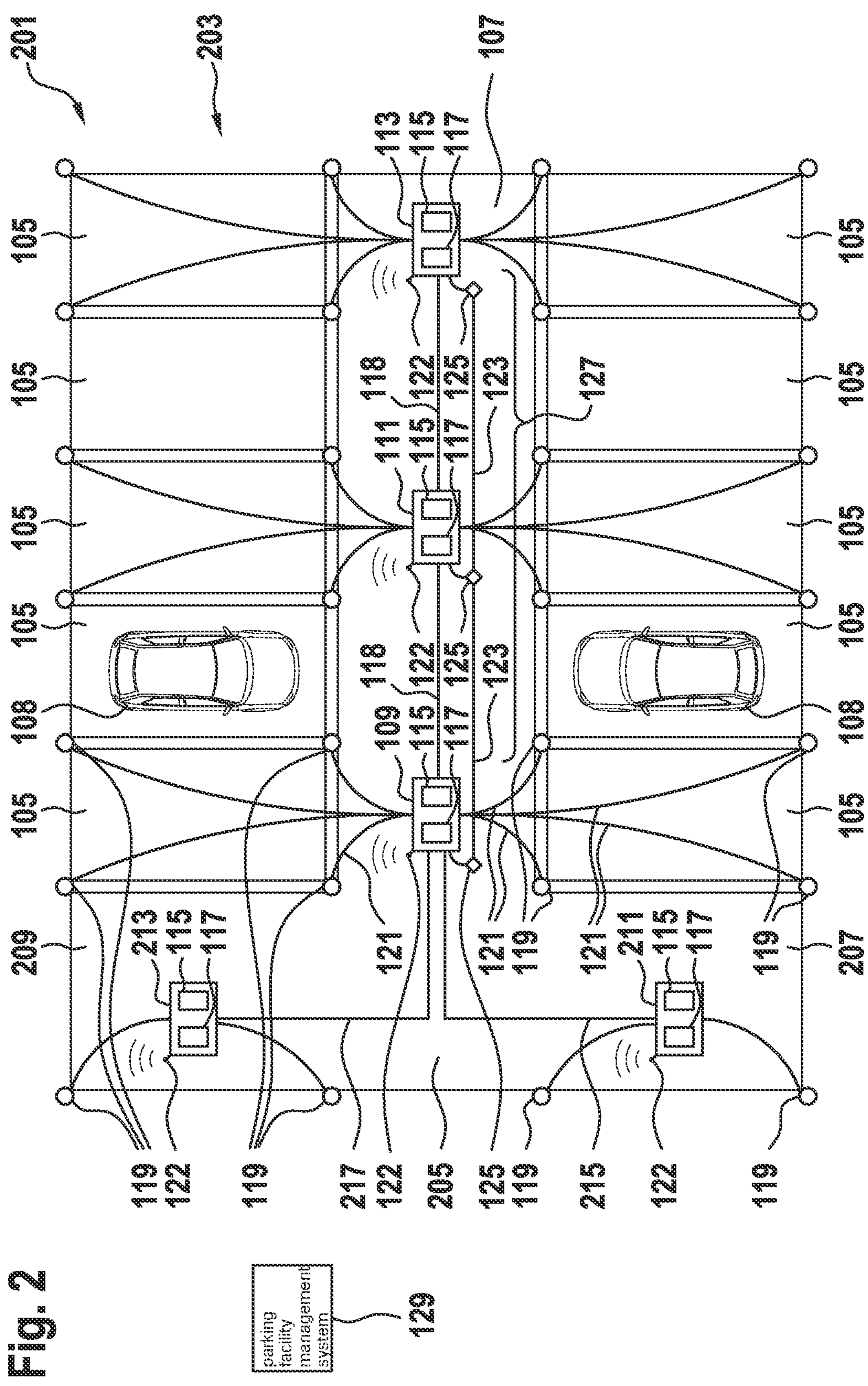
FIG. 2 shows a second system according to the first aspect of the present invention.

FIG. 2 shows a second system 201 for the infrastructure-based assistance of a motor vehicle driven in an at least semi-automated manner within parking facility 203 in a schematic top view. Second system 201 and second parking facility 203 include the respective features of first system 101 and of first parking facility 103. A repeated description is therefore dispensed with. The additional features are described below.

Roadway 107 joins a further roadway 205, which defines a further driving path for motor vehicles. Roadway 107 joins further roadway 205 from the right with respect to the paper plane, which is thus located to the left next to roadway 107 with respect to the paper plane. Further roadway 205 extends from the bottom to the top with respect to the paper plane and connects an entrance 207 with an exit 209 of second parking facility 203.

A fourth base unit 211 is situated along further roadway 205 between the junction and entrance 207, for example, at a ceiling of second parking facility 203. A fifth base unit 213 is situated along further roadway 205 between the junction and exit 209, for example, at a ceiling of second parking facility 203.

Fourth and fifth base units 211, 213 are identical to the three base units 109, 111, 113 of first system 101. Fourth base unit 211 is connected in series to first base unit 109 with the aid of respective first network switch 115. The corresponding connection is marked by a line with reference numeral 215. Fifth base unit 213 is connected in series to the first base unit with the aid of respective first network switch 115. The corresponding connection is marked by a line with reference numeral 217. Connections 215, 217 are Ethernet connections, for example.

Thus, daisy chain 127 is split into two sub-branches: connection 215 and connection 217.

Not shown but also present is a split of the electrical line for the purpose of supplying fourth and fifth base unit 211, 213 with electrical power.

Similar to the three base units 109, 111, 113, base units 211, 213 are also not connected to all surroundings sensors 119, which are located within second parking facility 203. Instead, fourth base unit 211 is connected to two surroundings sensors 119 with the aid of corresponding second network switch 117 and fifth base unit 213 is connected to two surroundings sensors 119 with the aid of corresponding second network switch 117, these surroundings sensors 119 being located in the immediate surroundings of the two base units 211, 213.

Figures 3, 4:
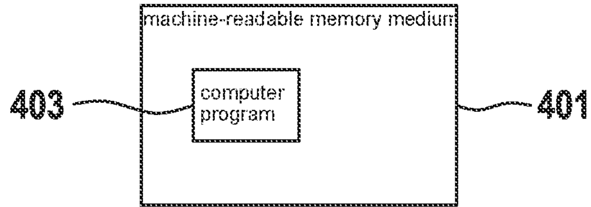
FIG. 3 shows a flowchart of a method according to the second aspect of the present invention.
FIG. 4 shows a machine-readable memory medium according to the fourth aspect of the present invention.

FIG. 3 shows a flowchart of a method for the infrastructure-based assistance of a motor vehicle driving in an at least semi-automated manner within a parking facility using the system according to the first aspect, including the following steps: operating 301 the parking facility with the aid of the parking facility management system, operating 301 including a planning 303 of a drive of the motor vehicle driving in an at least semi-automated manner within the parking facility in order to ascertain planning data corresponding to the planning, ascertaining 305 with the aid of the first base unit first infrastructure assistance data for the infrastructure-based assistance of the motor vehicle driving in an at least semi-automated manner within the parking facility based on the surroundings sensor data and the planning data, transmitting 307 the ascertained first infrastructure assistance data to the motor vehicle with the aid of the at least one wireless communication interface.

In one specific embodiment, the method includes a step of detecting the corresponding area of the at least one surroundings sensor.

FIG. 4 shows a machine-readable memory medium 401, on which a computer program 403 is stored. Computer program 403 includes commands which, when computer program 403 is executed by a computer, for example, by the system according to the first aspect, prompt the computer to carry out a method according to the second aspect.

Figure 5:
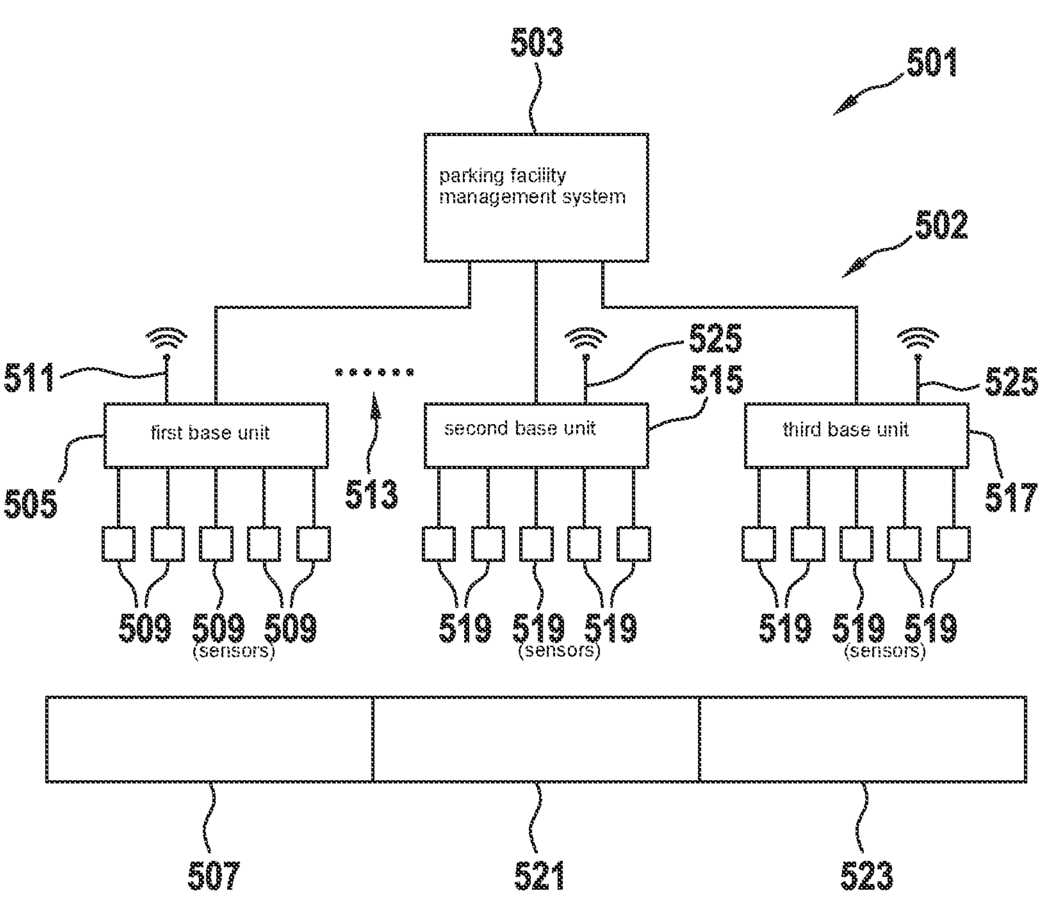
FIG. 5 shows a third system according to the first aspect of the present invention.

FIG. 5 shows a third system 501 for the infrastructure-based assistance of a motor vehicle driving in an at least semi-automated manner within a parking facility 502.

Third system 501 includes:

- a parking facility management system 503, which is configured to operate parking facility 502, the operation including a planning of a drive of the motor vehicle in an at least semi-automated manner within parking facility 502 in order to ascertain planning data corresponding to the planning,
- a first base unit 505, which is situated within parking facility 502 and is communicatively linked to parking facility management system 503,
- first base unit 505 being connected to multiple surroundings sensors 509 situated in the surroundings of first base unit 505, detecting a first area 507 of parking facility 502,
- first base unit 505 being configured to ascertain first infrastructure assistance data for the infrastructure-based assistance of the motor vehicle driving in an at least semi-automated manner within parking facility 502 based on surroundings sensor data of surroundings sensor 509 representing detected first area 507 and based on the planning data, and a wireless communication interface 511, which is configured to transmit the ascertained first infrastructure assistance data to the motor vehicle.

In a start configuration, third system 501 may, for example, include merely the first base unit and surroundings sensors 5009 as well as parking facility management system 503.

This start configuration may be easily expanded, which is represented symbolically by multiple dots with reference numeral 513. Such an expansion 513 includes an installation of further base units, for example, a second base unit 515 and a third base unit 517, which are communicatively linked to parking facility management system 503. Such an expansion 513 includes an installation of further surroundings sensors 519, which are connected to the further base units, in the present case, second and third base unit 515, 517.

Thus, second base unit 515 is able to monitor a second area 521 using its connected surroundings sensors 519 and third base unit 517 is thus able to monitor a third area 523 using its connected surroundings sensors 519. The three areas 507, 521, 523 are directly adjacent to one another. In one specific embodiment not shown, it is provided that directly adjacent areas partially overlap.

This therefore makes it advantageously possible to simply expand third system 501 over time without it having to be initially established within which areas of parking facility 502 motor vehicles are to be aided during an at least semi-automated drive.

Thus, third system 501 may be efficiently scaled as required.

To transmit the correspondingly conveyed infrastructure assistance data, each of base units 515, 517 includes a dedicated wireless communication interface 525.

In summary, the concept is based, among other things, for example, on the use of an edge computing architecture, in which a small number of surroundings sensors (for example, 4 through 16) are connected to one base unit. Calculations, i.e., the ascertainment of the infrastructure assistance data, which are required for the at least semi-automated driving of an AVP motor vehicle, are carried out on a base unit that is located close to an instantaneous motor vehicle position within the parking facility. This means that only surroundings sensor data of surroundings sensors close to the base unit have to be collected. This drastically reduces the required network bandwidth.

The concept is further based, among other things, on the use of a parking facility management system, which operates the parking facility, the operation including a planning of a drive of the motor vehicle driving in an at least semi-automated manner.

Base units are connected to adjacent base units, for example, in the form of a daisy chain. This makes it possible to use—if necessary—surroundings sensor data from surroundings sensors that are connected to the adjacent base unit. The use of a daisy chain instead of a tree topology reduces the cabling outlay.

For example, surroundings sensors, such as cameras, are provided, which cover a section of the driving path and are connected to a base unit that is situated in this section of the driving path.

For example, base units, which may generally also be referred to as processing units, are situated along the driving path that the AVP motor vehicle typically travels. The base units are connected to their neighbor along this driving path. At intersections or junctions, at which the AVP motor vehicle may go in two or more different directions, the daisy chain is also divided into two or more branches.

For example, it is provided that each base unit includes a wireless communication end point, the wireless communication interface, in order to be able to communicate directly with the AVP motor vehicle. The communication may therefore advantageously take place only over short distances.

A base unit includes, for example: a first network switch, which enables the connection to two or more adjacent base units, a second network switch, which makes it possible to connect this network switch to all surroundings sensors, for example, 8 surroundings sensors, as shown in FIG. 1, around the base unit, a computer for executing algorithms, the computer including, for example, a standard x86 CPU, the computer including, for example, one or multiple processors, and a wireless communication interface, which is, for example, a WLAN access point, in order to enable a wireless connection to the AVP motor vehicle.

When, for example, the AVP motor vehicle is located near a base unit, the base unit receives, for example, the surroundings sensor data from all surroundings sensors that are connected to the base unit itself, and—if necessary—also, for example, from the surroundings sensors that are connected to an adjacent base unit. Here, for example, this adjacent base unit will transmit the corresponding surroundings sensor data to the base unit. However, it is never necessary, for example, to receive surroundings sensor data from a far removed surroundings sensor, since the latter may, for example, not be relevant for the AVP motor vehicle. No high network bandwidth is therefore necessary.

The base unit subsequently localizes the AVP motor vehicle, for example, based on the surroundings sensor data. The base unit detects, for example, vacant spaces based on the surroundings sensor data, calculates, for example, a drive authorization for the motor vehicle and transmits, for example, these infrastructure assistance data (pieces of information about vacant spaces, drive authorization) via the wireless communication interface, for example, via the integrated WLAN access point, to the AVP motor vehicle.

When the AVP motor vehicle moves, for example, in the area of the next base unit, the tasks are transferred, for example, to the next base unit. Thus, the algorithms are always executed, for example, on a base unit close to the AVP motor vehicle. This reduces the network traffic and makes it possible to assist multiple AVP motor vehicles in parallel. Two AVP motor vehicles will, for example, always be so far apart from one another that the calculations for driving the AVP motor vehicles are able to be carried out, for example, on different base units.

Since multiple base units, for example, are installed within the parking facility, there are, for example, enough base units in order to enable also redundant calculations, which are necessary in order to achieve the required safety integrity.

The base units that are connected to one another form, for example, a daisy chain. The daisy chain is, for example, connected in such a way that it follows the driving paths that an AVP motor vehicle may take in the parking facility. This means that at intersections, the daisy chain also extends in more than two directions, so that at the intersection, the AVP motor vehicle is able to drive in all directions and is able to be further assisted.

The daisy chain is, for example, communicatively linked with the parking facility management system. As a result, each base unit may, for example, be connected to the parking facility management system, which enables a remote monitoring and remote maintenance of the base units by the parking facility management system.

What is claimed is:

1. A system for infrastructure-based assistance of a motor vehicle driven in an at least semi-automated manner within a parking facility, comprising:

a parking facility management system configured to operate the parking facility, the operation including a planning of a drive of the motor vehicle driven in an at least semi-automated manner within the parking facility to ascertain planning data corresponding to the planning;

a first base unit implemented as an edge device installed as part of the parking facility and communicatively linked to the parking facility management system, the first base unit being connected to surroundings sensors situated within the parking facility in surroundings of the first base unit detecting a first area of the parking facility, the first base unit being configured to ascertain first infrastructure assistance data for the infrastructure-based assistance of the motor vehicle driven in an at least semi-automated manner within the parking facility based on surroundings sensor data of the surroundings sensors representing the detected first area and based on the planning data, wherein the first base unit is connected to a subset of the surroundings sensors located in a surroundings region of the first base unit, and wherein the first base unit is configured to receive the planning data from the parking facility management system and ascertain the first infrastructure assistance data locally based on the surroundings sensor data and the received planning data; and at least one wireless communication interface configured to transmit the ascertained first infrastructure assistance data to the motor vehicle.

2. The system as recited in claim 1, further comprising:

a second base unit installed as part of the parking facility spaced apart from the first base unit, the second base unit being connected in series to the first base unit and being communicatively linked to the parking facility management system, the second base unit being connected to at least one further surroundings sensor within the parking facility in surroundings of the second base unit and detecting a second area of the parking facility, the second base unit being configured to ascertain second infrastructure assistance data for the infrastructure-based assistance of the motor vehicle driven in an at least semi-automated manner within the parking facility based on further surroundings sensor data of the at least one further surroundings sensor representing the detected second area;

wherein the at least one wireless communication interface is configured to transmit the ascertained second infrastructure assistance data to the motor vehicle.

3. The system as recited in claim 2, wherein the first base unit is configured to ascertain the first infrastructure assistance data based on the further surroundings sensor data of the at least one further surrounding sensor of the second base unit, and the second base unit is configured to ascertain the second infrastructure assistance data based on the surroundings sensor data of the surrounding sensors of the first base unit.

4. The system as recited in claim 1, wherein the operation includes one or more of the following: updating the first base unit, updating the at least one surroundings sensor, monitoring the first base unit, monitoring the at least one surroundings sensor, verifying the first base unit, verifying the at least one surroundings sensor, executing an order for the at least semi-automated driving of the motor vehicle within the parking facility.

5. The system as recited in claim 1, wherein the parking facility management system is implemented in a cloud infrastructure and/or locally within the parking facility.

6. A method for infrastructure-based assistance of a motor vehicle driven in an at least semi-automated manner within a parking facility using a system including:

a parking facility management system configured to operate the parking facility, the operation including a planning of a drive of the motor vehicle driven in an at least semi-automated manner within the parking facility to ascertain planning data corresponding to the planning, a first base unit implemented as an edge device installed as part of the parking facility and communicatively linked to the parking facility management system, the first base unit being connected to at least one surroundings sensor situated within the parking facility in surroundings of the first base unit detecting a first area of the parking facility, the first base unit being configured to ascertain first infrastructure assistance data for the infrastructure-based assistance of the motor vehicle driven in an at least semi-automated manner within the parking facility based on surroundings sensor data of the surroundings sensors representing the detected first area and based on the planning data, wherein the first base unit is connected to a subset of the surroundings sensors located in a surroundings region of the first base unit, and wherein the first base unit is configured to receive the planning data from the parking facility management system and ascertain the first infrastructure assistance data locally based on the surroundings sensor data and the received planning data, and at least one wireless communication interface configured to transmit the ascertained first infrastructure assistance data to the motor vehicle, wherein the method includes the following steps:

operating the parking facility using the parking facility management system, the operation including the planning of the drive of the motor vehicle driving in an at least semi-automated manner within the parking facility to ascertain the planning data corresponding to the planning, ascertaining, using the first base unit, first infrastructure assistance data for the infrastructure-based assistance of the motor vehicle driven in an at least semi-automated manner within the parking facility based on the surroundings sensor data and the planning data; and transmitting the ascertained first infrastructure assistance data to the motor vehicle using the at least one wireless communication interface.

7. A non-transitory machine-readable memory medium on which is stored a computer program for infrastructure-based assistance of a motor vehicle driven in an at least semi-automated manner within a parking facility using a system including:

a parking facility management system configured to operate the parking facility, the operation including a planning of a drive of the motor vehicle driven in an at least semi-automated manner within the parking facility to ascertain planning data corresponding to the planning, a first base unit implemented as an edge device installed as part of the parking facility and communicatively linked to the parking facility management system, the first base unit being connected to at least one surroundings sensor situated within the parking facility in surroundings of the first base unit detecting a first area of the parking facility, the first base unit being configured to ascertain first infrastructure assistance data for the infrastructure-based assistance of the motor vehicle driven in an at least semi-automated manner within the parking facility based on surroundings sensor data of the surroundings sensors representing the detected first area and based on the planning data, wherein the first base unit is connected to a subset of the surroundings sensors located in a surroundings region of the first base unit, and wherein the first base unit is configured to receive the planning data from the parking facility management system and ascertain the first infrastructure assistance data locally based on the surroundings sensor data and the received planning data, and at least one wireless communication interface configured to transmit the ascertained first infrastructure assistance data to the motor vehicle, wherein the computer program, when executed by a computer, causing the computer to perform the following steps:

operating the parking facility using the parking facility management system, the operation including the planning of the drive of the motor vehicle driving in an at least semi-automated manner within the parking facility to ascertain the planning data corresponding to the planning, ascertaining, using the first base unit, first infrastructure assistance data for the infrastructure-based assistance of the motor vehicle driven in an at least semi-automated manner within the parking facility based on the surroundings sensor data and the planning data; and transmitting the ascertained first infrastructure assistance data to the motor vehicle using the at least one wireless communication interface.

* * * * *